US012792839B2

(12) United States Patent
Levi-Raz et al.

(10) Patent No.: US 12,792,839 B2
(45) Date of Patent: Nov. 10, 2026

(54) SYSTEM, METHOD, AND COMPUTER PROGRAM FOR EVOLVING MULTI-TURN CHATBOT DIALOGS

(71) Applicant: Amdocs Development Limited, Limassol (CY)

(72) Inventors: Liad Levi-Raz, Kfar Neter (IL); Laila Sprejer, Ramat Gan (IL); Andrew Baxter, Chippenham (GB); Mary Tsilov, Dallas, TX (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 169 days.

(21) Appl. No.: 18/755,440

(22) Filed: Jun. 26, 2024

(65) Prior Publication Data

US 2026/0004077 A1 Jan. 1, 2026

(51) Int. Cl.
*G06F 17/00* (2019.01)
*G06F 40/30* (2020.01)

(52) U.S. Cl.
CPC .................................... *G06F 40/30* (2020.01)

(58) Field of Classification Search
USPC .............................................................. 704/9
See application file for complete search history.

(56) References Cited

U.S. PATENT DOCUMENTS 12,380,282 B2 * 8/2025 Leary ...................... G06F 40/30
2024/0311407 A1 * 9/2024 Barron ................ G06F 16/3344
2024/0419905 A1 * 12/2024 Mai ........................ G01C 21/32
2025/0238433 A1 * 7/2025 Sussman ................ G06Q 10/10
2025/0374321 A1 * 12/2025 Park .................. H04W 74/0808
2025/0384280 A1 * 12/2025 Gado ................... G06N 3/0895

OTHER PUBLICATIONS

Zheng et al., "Judging LLM-as-a-Judge with MT-Bench and Chatbot Arena," arXiv, 2023, pp. 1-29, retrieved from https://arxiv.org/pdf/2306.05685.pdf.
Sprejer et al., U.S. Appl. No. 18/967,412, filed Dec. 3, 2024.
Sprejer et al., U.S. Appl. No. 19/002,514, filed Dec. 26, 2024.

(Continued)

*Primary Examiner* — Satwant K Singh
(74) *Attorney, Agent, or Firm* — Zilka-Kotab, P.C.

(57) ABSTRACT

As described herein, an LLM-based chatbot is evolved over at least one iteration. The iteration includes presenting, by a LLM-based evaluator, a question to a LLM-based chatbot during a dialog with the LLM-based chatbot comprised of a sequence of question and answer pairs. The iteration includes receiving, by the LLM-based evaluator, an answer to the question from the LLM-based chatbot. The iteration includes evaluating, by the LLM-based evaluator, the answer according to one or more evaluation metrics and a ground truth. The iteration includes determining, by the LLM-based evaluator, that a result of the evaluation is unsatisfactory. The iteration includes presenting, by the LLM-based evaluator, a follow-up question to the LLM-based chatbot designed to encourage a new answer of the LLM-based chatbot to be satisfactory with respect to the ground truth and to cause an optimization of the LLM-based chatbot.

20 Claims, 4 Drawing Sheets

(56) References Cited

OTHER PUBLICATIONS

International Search Report and Written Opinion from PCT Application No. PCT/IB2025/056326, dated Oct. 14, 2025, 11 pages.
Zhao et al., "Auto Arena of LLMs: Automating LLM Evaluations with Agent Peer-battles and Committee Discussions," arXiv, 2024, pp. 1-19.
Lin et al., "LLM-Eval: Unified Multi-Dimensional Automatic Evaluation for Open-Domain Conversations with Large Language Models," arXiv, 2023, 12 pages.
Dziri et al., "Evaluating Coherence in Dialogue Systems using Entailment," arXiv, 2020, 7 pages, retrieved from https://arxiv.org/pdf/1904.03371.
Yao, M., "New Ways to Evaluate Open-Domain Conversational Agents," TOPBOTS, May 22, 2021, 11 pages, retrieved from https://www.topbots.com/conversational-ai-evaluation-metrics/.
Patel, S., "Chatbot Analytics: Essential Metrics & KPIs to Measure Bot Success," REVE Chat, Jun. 5, 2024, 6 pages, retrieved from https://www.revechat.com/blog/chatbot-analytics-metrics/.

* cited by examiner

SYSTEM, METHOD, AND COMPUTER PROGRAM FOR EVOLVING MULTI-TURN CHATBOT DIALOGS

FIELD OF THE INVENTION

The present invention relates to creating chatbot dialog flows.

BACKGROUND

In the rapidly growing world of large language models (LLMs), where new models and versions are released weekly, it is important to have the means of measuring and comparing LLM performance (benchmarking). Automatic evaluation of LLM-based solutions are crucial to support rapid application development iterations and assessment of emerging models and technologies enabling large time, resource and money savings for companies.

Traditionally, the evaluation of single turn question and answer in terms of its correctness or accuracy was done in one of the following ways:

(1) Manual—Human annotators: This is done by a subject matter expert that knows the expected answer and evaluates the generated one.

(2) Automated—Using metrics such as Semantic Similarity—the cosine similarity between the generated answer and the ground truth, which has an interpretation of semantic similarity (i.e. if the angle between two vectors in the embedding space is smaller, meaning they are on the "same direction", they are assumed to be semantically similar). Even though this is an automatic scoring method, it requires the creation of a ground truth dataset to compare the predicted versus the labeled answers.

The rapid expansion of LLM-based chatbots has uncovered a new problem for question and answer evaluation: due to the unpredictability of dialogues (i.e. depending on the human interlocutor, the conversation can very quickly diverge), establishing a ground truth for a conversation is not always trivial, sometimes making the standard question and answer unhelpful.

There is thus a need for addressing these and/or other issues associated with the prior art. For example, there is a need for evolving multi-turn chatbot dialogs based on a LLM-based evaluation.

SUMMARY

As described herein, an LLM-based chatbot is evolved over at least one iteration. The iteration includes presenting, by a LLM-based evaluator, a question to a LLM-based chatbot during a dialog with the LLM-based chatbot comprised of a sequence of question and answer pairs. The iteration includes receiving, by the LLM-based evaluator, an answer to the question from the LLM-based chatbot. The iteration includes evaluating, by the LLM-based evaluator, the answer according to one or more evaluation metrics and a ground truth. The iteration includes determining, by the LLM-based evaluator, that a result of the evaluation is unsatisfactory. The iteration includes presenting, by the LLM-based evaluator, a follow-up question to the LLM-based chatbot designed to encourage a new answer of the LLM-based chatbot to be satisfactory with respect to the ground truth and to cause an optimization of the LLM-based chatbot.

DETAILED DESCRIPTION

Figure 1:
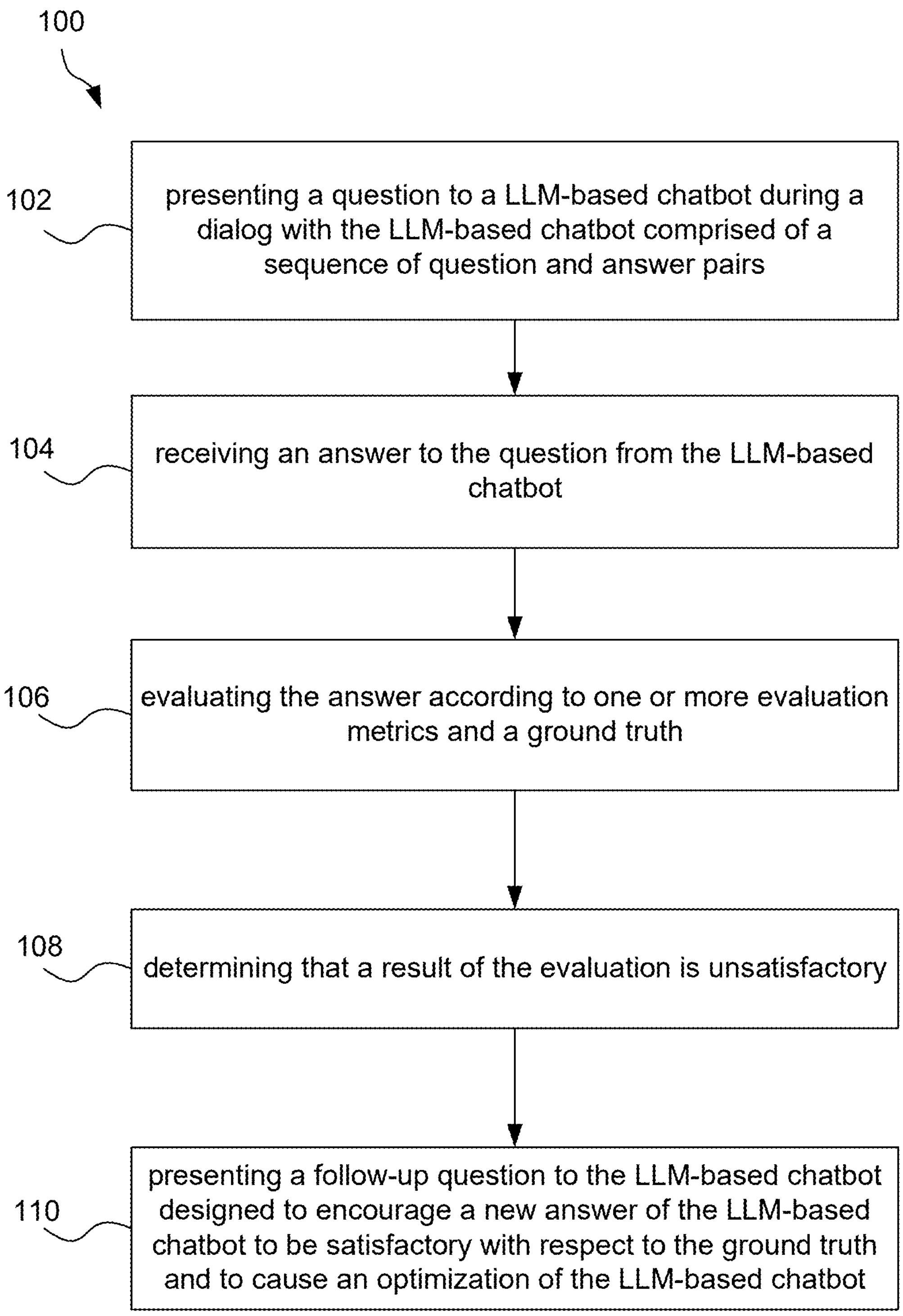
FIG. 1 illustrates a method for evolving an LLM-based chatbot, in accordance with one embodiment.

FIG. 1 illustrates a method 100 for evolving an LLM-based chatbot, in accordance with one embodiment. The method may be carried out by a computer system, such as that described below with respect to FIGS. 3 and/or 4. In the context of the present description, the method 100 is carried out by a LLM-based evaluator. The LLM-based evaluator refers to an LLM other than the LLM-based chatbot that is configured to evaluate and evolve the LLM-based chatbot over one or more iterations. The method 100 represents one iteration of the LLM-based evaluator, and accordingly in some embodiments the method 100 may be repeated for one or more additional iterations. The LLM-based chatbot may be evolved (e.g. trained, fine-tuned, optimized, etc.) for the purpose of being used by a real-world application or task.

In operation 102, a question is presented to the LLM-based chatbot during a dialog with the LLM-based chatbot comprised of a sequence of question and answer pairs. The dialog occurs between the LLM-based evaluator and the LLM-based chatbot. The dialog refers to questions presented by the LLM-based evaluator to the LLM-based chatbot and answers generated by the LLM-based chatbot in response to the questions.

In an embodiment, the question may be determined by the LLM-based evaluator based upon a test case predefined for the LLM-based chatbot. In an embodiment, multiple test cases may be predefined for the LLM-based chatbot, for example where each iteration of the method 100 is performed for a different one of the test cases. In an embodiment, the question may be preconfigured for the test case. In an embodiment, the question may be generated by the LLM-based evaluator based upon parameters of the test case. In an embodiment, the test case may also indicate a ground truth answer for the question or for the parameters of the test case.

The question may be presented to the LLM-based chatbot by inputting the question to the LLM-based chatbot. The LLM-based evaluator may be configured to input the question to the LLM-based chatbot, in an embodiment. For example, an application programming interface (API) to the LLM-based chatbot may be used to input the question to the LLM-based chatbot.

In operation 104, an answer to the question is received from the LLM-based chatbot. In particular, the LLM-based chatbot processes the question to generate the answer. The answer is then input from the LLM-based chatbot to the LLM-based evaluator. For example, an API to the LLM-based evaluator may be used to input the answer to the LLM-based evaluator.

In operation 106, the answer is evaluated according to one or more evaluation metrics and a ground truth. As mentioned above, the ground truth may be defined for the test case, in an embodiment. The ground truth refers to an expected answer to the question presented to the LLM-based chatbot.

The evaluation metrics refer to any predefined criteria by which the answer may be evaluated. In an embodiment, the one or more evaluation metrics include one or more automatically calculable natural language processing (NLP) measures. In an embodiment, the evaluating may include calculating a score for the answer based on the one or more evaluation metrics and the ground truth. In an embodiment, the evaluating of the answer may be further performed according to prior question and answer pairs occurring in the dialog (i.e. a history of the dialog).

In operation 108, it is determined that a result of the evaluation is unsatisfactory. In an embodiment, the result of the evaluation may be considered unsatisfactory when the score is below a predefined threshold. Likewise, the result of the evaluation may be considered satisfactory when the score meets or exceeds the predefined threshold.

In operation 110, a follow-up question is presented to the LLM-based chatbot which is designed to encourage a new answer of the LLM-based chatbot to be satisfactory with respect to the ground truth and to cause an optimization of the LLM-based chatbot. Thus, the follow-up question may prompt the LLM-based chatbot to return an answer that more closely aligns with the ground truth.

In an embodiment, the new answer given by the LLM-based chatbot to the follow-up question may be evaluated in the same manner as described above. A result of this evaluation may similarly be determined to be satisfactory or unsatisfactory. In an embodiment, up to a threshold number of follow-up questions may be presented to the LLM-based chatbot until the new answer of the LLM-based chatbot is evaluated to be satisfactory with respect to the ground truth. In an embodiment, when the threshold number of follow-up questions are presented without the new answer of the LLM-based chatbot being evaluated as satisfactory with respect to the ground truth, then an error analysis may be caused to be performed on the LLM-based chatbot.

To this end, the method 100 may be performed as a single iteration of evolving the LLM-based chatbot. In particular, the LLM-based chatbot may learn from the follow up questions of the LLM-based evaluator to provide answers that more closely align with the ground truth. In an embodiment, the LLM-based chatbot may be evolved over a plurality of iterations each corresponding to different question and answer pair in the sequence of question and answer pairs included in the dialog. In an embodiment, when the LLM-based evaluator determines that a result of the evaluation for a given question and answer pair is satisfactory with respect to the ground truth, then the LLM-based evaluator may begin a next iteration of the plurality of iterations (i.e. for a new question and answer pair, a new test case, etc.).

In an embodiment, the LLM-based chatbot may be initially trained on a dataset comprised of individual question and answer pairs, as opposed to a training set corresponding to dialogs. In an embodiment, the LLM-based chatbot may be evolved per the method 100 to include a multi-turn question and answer (i.e. a dialog) dataset. In an embodiment, the evolved LLM-based chatbot may finally be output for use (e.g. by the application or task).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
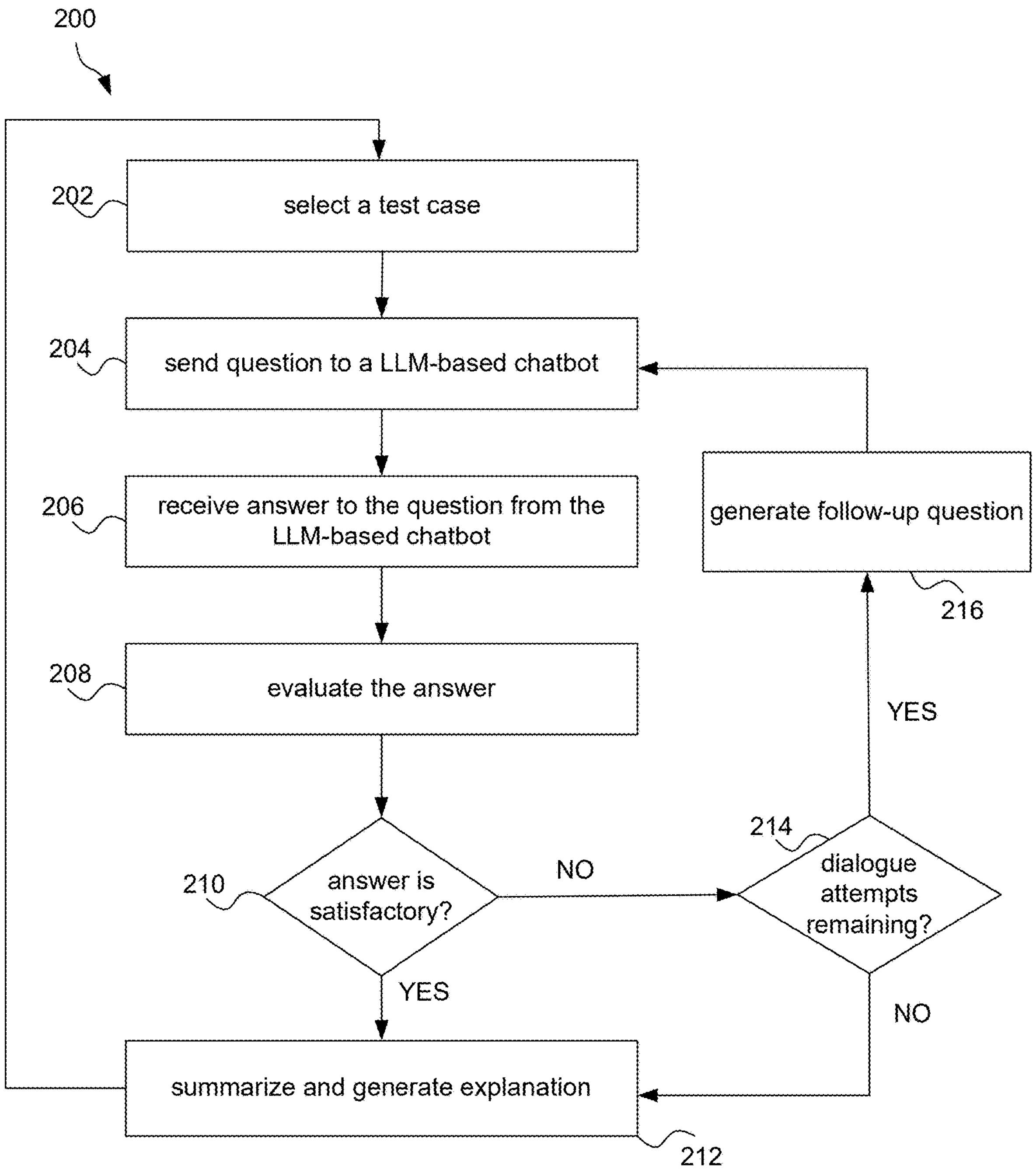
FIG. 2 illustrates a method of an LLM-based evaluator that evolves an LLM-based chatbot over a plurality of iterations, in accordance with one embodiment.

FIG. 2 illustrates a method 200 of an LLM-based evaluator that evolves an LLM-based chatbot over a plurality of iterations, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

In operation 202, a test case is selected. The test case indicates a question for which an LLM-based chatbot is to be evaluated. The test case may indicate a ground truth for the question, in an embodiment. The test case may be selected from among a plurality of test cases predefined for the LLM-based chatbot. The test case may be selected as an initial test case in a flow of test cases predefined for the LLM-based chatbot.

In operation 204, the question is sent to the LLM-based chatbot. In operation 206, an answer to the question is received from the LLM-based chatbot. In operation 208, the answer is evaluated. In an embodiment, the LLM-based evaluator may evaluate the answer based on scores given to the answer for a plurality of predefined evaluation metrics. In an embodiment, the LLM-based evaluator may score the answer with respect to one or more predefined evaluation metrics. In an embodiment, another system or algorithm may score the answer with respect to one or more predefined evaluation metrics. Table 1 illustrates various examples of evaluation metrics.

TABLE 1

| Metric Name | Description | Value Range | Method |
|---|---|---|---|
| Completeness | 1 indicates a complete answer which relates to everything that was discussed in the dialogue history. 0 indicates an incomplete answer. | A float [0., 1.] | By LLM (e.g. GPT-4) |
| Accuracy | 1 is assigned only if there are no mistakes in any numbers calculations nor mixing of items and amounts, 0 indicates mistakes were found. | an integer 1 or 0 | By LLM (e.g. GPT-4) |
| Topic coherence | evaluate the coherence of a dialogue topic. measure how well the dialogue system maintains the topic of the dialogue, where 1 is the best score and 0 is the worst. | a float in range [0., 1.] | By LLM (e.g. GPT-4) |

TABLE 1-continued

| Metric Name | Description | Value Range | Method |
|---|---|---|---|
| Dialogue coherence | use cosine similarity to calculable approximations of human judgment, measure how logically consistent the responses of the dialogue system are, where 1 is the best score and 0 is the worst. Calculated per dialog. | a float in range [0., 1.] | By LLM (e.g. GPT-4) |
| Fallback rate | an Integer, counts the scenarios where the chatbot is not able to understand the user request and provide a relevant solution. For example, the number of times both get confused and replies: "Sorry, I don't understand". | an Integer | By LLM (e.g. GPT-4) |
| Normalized Semantic Similarity | The cosine similarity between the embeddings of the Ground Truth and the Generated Answer normalized between 0 and 1 | a float in range [0., 1.] | By and independent library such as Sentence Transformers (SBERT) |

In an embodiment, the total evaluation score computed for the answer may be a weighted average of the scores listed in Table 2 (all between 0 and 1), which gives more attention on the accuracy, completeness, and on 'no hallucinations'.

TABLE 2

$$IndicatoramAIz \text{ score} = \frac{0.2\cdot A + 0.15\cdot B + 0.1\cdot C + 0.1\cdot D + 0.1\cdot E + 0.15\cdot F + 0.2\cdot G}{7}$$

Where
A Answer Relevance
B Answer Faithfulness
C Dialog Coherence
D No Fallback Indicator
E Answer Completeness
F Semantic_Similarity_Pred_GT
G No Hallucination In an embodiment, the evaluation metrics may be customizable, meaning if for some test cases other metrics are required, they can be added to the final score calculation. Also, the weights of every metric can be controlled in the final weighted average score.

In decision 210, it is determined whether the answer is satisfactory. A result of the evaluation may be used to determine whether the answer is satisfactory with regard to a predefined threshold. In an embodiment, the final score computed for the answer may be compared to the threshold to determine whether the answer is satisfactory.

When it is determined in decision 210 that the answer is satisfactory, then in operation 212 a result of the evaluation for the test case is summarized and an explanation is generated. The explanation indicates how the answer relates/differs from the ground truth. The summary and the explanation may be output back to the LLM-based chatbot for learning purposes. The method 200 then returns to operation 202 to select a new test case for the LLM-based chatbot.

When it is determined in decision 210 that the answer is not satisfactory, then it is determined in decision 214 whether there are any remaining dialog attempts. In particular, up to a threshold number of follow-up questions may be presented to the LLM-based chatbot until a new answer of the LLM-based chatbot is evaluated to be satisfactory. When it is determined that no additional dialog attempts remain, then the method 200 returns to operation 212 where a result of the evaluation for the test case is summarized and an explanation is generated.

When it is determined that additional dialog attempts remain, then in operation 216 a follow-up question is generated. The follow-up question is designed to encourage a new answer of the LLM-based chatbot to be satisfactory and to cause an optimization of the LLM-based chatbot. The method 200 then returns to operation 204 to send the follow-up question to the LLM-based chatbot for additional evaluation. In an embodiment, a history of the dialog with the LLM-based chatbot may also be presented to the LLM-based chatbot, for use in generating a new answer to the follow-up question.

To this end, the method 200 enables the LLM-based chatbot to undergo a process of constant learning and enhancement. By receiving instant feedback and subsequent inquiries, answers can be modified for better alignment with the ground truth. This iterative process contributes to the creation of improved multi-turn datasets and promotes behaviors that are more in line with the ground truth. For example, such datasets can be used as an input for Reinforcement Learning from Human Feedback (RLHF) process where human annotators are asked to select the best answer from two or more given answers. The LLM-based chatbot can be initially trained with a single question and answer dataset, which can then evolve into a multi-turn question and answer dataset. In addition, the method 200 allows for problematic data instances where the LLM-based chatbot underperforms to be focused on. In cases where the metric threshold is not improved after few attempts, these cases may be subject to a deeper error analysis as they are the places where the LLM-based chatbot underperforms.

Table 3 illustrates an example of an LLM-based evaluator prompt, for an evaluation datasets, which takes the output of prior detection steps and calculates additional relevant metrics.

TABLE 3

""""You are a helpful AI assistant, evaluating a dialogue between a human and an Expert Billing Care AI agent.
Report the following scores:
- Accurate_Conclusion_indicator: Provide the score as a Boolean either 0 or 1, where 1 is where the generated answer has the same AI conclusion as in the real answer, and 0 if it did not. In case the real answer does not include a conclusion, provide a default score of 1.
- Answer_Relevance: Measure the generated answer relevancy to the question based on the real answer. Provide a float score between 0 and 1, where 1 is perfectly relevant and 0 is totally irrelevant. Any number in between indicates the level of partial relevance of the response to the question. Note that additional statements that are not in the real answer should be treated as irrelevant!
- Topic_Coherence: Measure the coherence of the answer, how well the system maintains the topics of the question. Provide a float score between 0 and 1, where 1 is given when the system perfectly maintains the topics discussed, and 0 is where it is not. Any number in between indicates the ratio of topics that were maintained compared to all the topics being discussed in the dialogue.
- No_Fallback_Indicator: (1- FBR) The no fallback indicator captures the scenario where the AI is not able to understand the user request and does not provide a relevant solution. For example, the number of times the AI get confused and replies: "Sorry, I don't understand, please call the customer service center for more information". Provide the No_Fallback_Indicator score as a Boolean value 0 or 1, where 1 means no fallback, and 0 means fallback. NOTE that if the generated answer says that a question is 'out of scope' where the real answer shows otherwise, then the No_Fallback_Indicator should be 0 (a Fallback).
- No_Toxicity: Provide the score as a float in range 0 and 1 that measures how non-toxic the generated answer is. where 1 means it is non-toxic, 0 means highly toxic, and any number in between indicates the level of toxicity found.
- Readability: Measure the readability of the generated answer. Provide a float score between 0 and 1, where 1 is given when the generated answer is perfectly readable (clear, well-structured, and easy to understand), and 0 is given when it is not readable at all (unclear, poorly structured, or difficult to understand). Any number in between indicates the ratio of the generated answer statements that were readable compared to all the statements provided in the generated answer.
- Scores_Reasoning: Provide a short reasoning for all the scores provided above except the Final_Average_score.
Here is the question:
{query}
Here is the real answer:
{answer}
Here is the predicted answer:
{result}
ALWAYS Return the scores in a structured JSON format using double quotes for values (as strings).
Make sure to always return a value for all the scores, even if empty use "0" as a default value, for example:
{{"Accurate_Conclusion_indicator":"0", "Answer_Relevance": "0.0", "Topic_Coherence": "0.0", "No_Fallback_Indicator": "0", "No_Toxicity": "0","Readability":"0", "Scores_Reasoning": "<explain ...>"}}

Table 4 illustrates an example of a follow-up question prompt that can be used for the dataset evolution and online evaluation tasks.

TABLE 4

You are a human talking to a Telco customer service chatbot.
Given a chatbot answer in English, and a ground-truth answer in English, you should provide a fluent and relevant follow-up question to ask (in English),
that should hopefully improve the bot's next answer and make it more semantically similar to the ground-truth answer.
'''

Table 5 illustrates various example dialogs between an Evaluator (LLM-based evaluator) and an Evaluee (LLM-based chatbot).

TABLE 5

1. Happy Path - a good answer after a single turn
   Here we get immediate feedback that the chatbot answered correctly passing the performance threshold.

Evaluator1: I am on a prepaid plan, on my trip to Australia, I got 5 text messages and sent 7, how much will it cost me?
Evaluee1: Based on the rates for the Simply Super Prepaid plan in Australia, it costs TABLE 5-continued $0.50 to send a text and $0.10 to receive one. Therefore, for sending 7 text messages, it will cost you $3.50 (7 texts * $0.50/text). For receiving 5 text messages, it will cost you $0.50 (5 texts * $0.10/text). So, in total, it will cost you $4.00.

Evaluation:

"Completeness": 1.0,
"Accuracy": 1,
"Semantic_Similarity_llm": 0.98,
"Topic_coherence": 1.0,
"Dialogue_coherence": 1.0,
"Fallback_rate": 0,
"Explanation": "The chatbot provided a complete and accurate response to the user's question about the cost of sending and receiving texts in Australia with the Simply Super Prepaid plan. The chatbot maintained the topic of the dialogue and provided a logically consistent response. There were no instances where the chatbot failed to understand the user's request. The semantic similarity between the real and predicted answer is very high, indicating that the chatbot's response was very similar to the expected answer.

2. Chatbot succeeds with clarifying dialog (2 turns)

Here we can use the last chatbot improved answer as a new ground truth label candidate for our model training and evaluation datasets.

Evaluator1: I am on a prepaid plan, I got 5 text messages and sent 7, how much will it cost me?

Evaluee1: As a SuperMobile care agent, I would need more information to provide an accurate answer. Specifically, I would need to know the country you are currently in and the specific prepaid plan you are on. However, generally, if you are in one of the 180+ countries where SuperMobile offers free texting, there would be no charge for receiving or sending text messages. If you are not in one of these countries, charges may apply. Please check the specific terms of your prepaid plan or provide more details so I can assist you further.

Evaluator2: I am in Australia , and using the Simply Super Prepaid

Evaluee2: Thank you for providing the information, based on the rates for the Simply Super Prepaid plan in Australia, it costs $0.50 to send a text and $0.10 to receive one. Therefore, for sending 7 text messages, it will cost you $3.50 (7 texts * $0.50/text). For receiving 5 text messages, it will cost you $0.50 (5 texts * $0.10/text). So, in total, it will cost you $4.00.

Evaluation:

"Completeness": 0.5,
"Accuracy" 0,
"Semantic_Similarity_llm": −0.2,
"Topic_coherence": 0.8,
"Dialogue_coherence": 0.7,
"Fallback_rate": 1,
"Explanation": "The chatbot's response was partially complete as it did address the user's question about the cost of sending and receiving text messages on a prepaid plan, but it did not provide a specific answer. The accuracy is 0 because the chatbot did not provide any calculations or specific numbers. The semantic similarity is −0.2, indicating that the predicted answer was not very similar to the real answer. The topic coherence is 0.8 because the chatbot did stay on the topic of text message costs on a prepaid plan. The dialogue coherence is 0.7 because the chatbot's response was logically consistent, but it did not provide a specific answer to the user's question. The fallback rate is 1 because the chatbot was not able to provide a specific answer to the user's question."

3. Chat fails due to callback limit exceeded

Here we get immediate negative feedback that the chatbot was not able to answer correctly in the predefined number of attempts, which means we need to focus on this in our error analysis.

Evaluator1: I am on a cruise, how much for a 10 min call?

Evaluee1: If you're on a cruise ship, calls are charged at SuperWorld rates, regardless of your plan. Please check the SuperWorld Calling rates for the exact cost per minute.

Evaluator2: can you elaborate a little more, how much will I have to pay?

Evaluee2: The cost for a 10-minute call while on a cruise ship is charged at SuperWorld rates, regardless of your plan. Please check the SuperWorld Calling rates for the exact cost per minute.

Evaluator3: Can you give me a specific example?

Evaluee3: I'm sorry for any confusion, but as a SuperMobile agent, I don't have the specific rates for SuperWorld Calling. The cost can vary depending on several factors. I recommend checking the SuperWorld Calling rates directly for the most accurate information.

Evaluation:

"Completeness": 0.5,
"Accuracy": 0,
"Semantic_Similarity_llm": 0.6,
"Topic_coherence": 1.0,
"Dialogue_coherence": 0.8,
"Fallback_rate": 3,
"Explanation": "The chatbot's response was partially complete as it did address the user's question about the cost of calling while on a cruise ship, but it did not provide a specific answer. The accuracy is 0 because the chatbot did not provide any calculations or specific numbers. The semantic similarity is 0.6 as both the real and predicted answers discuss the cost of calls from cruise ships, but the TABLE 5-continued

| |
|---|
| predicted answer does not provide a specific cost. The topic coherence is 1.0 as the chatbot stayed on the topic of calling costs on a cruise ship throughout its response. The dialogue coherence is 0.8 as the chatbot's response was logically consistent, but it did not provide a specific answer to the user's question. The fallback rate is 2 as the chatbot was not able to provide a specific answer to the user's question." |

Figure 3:
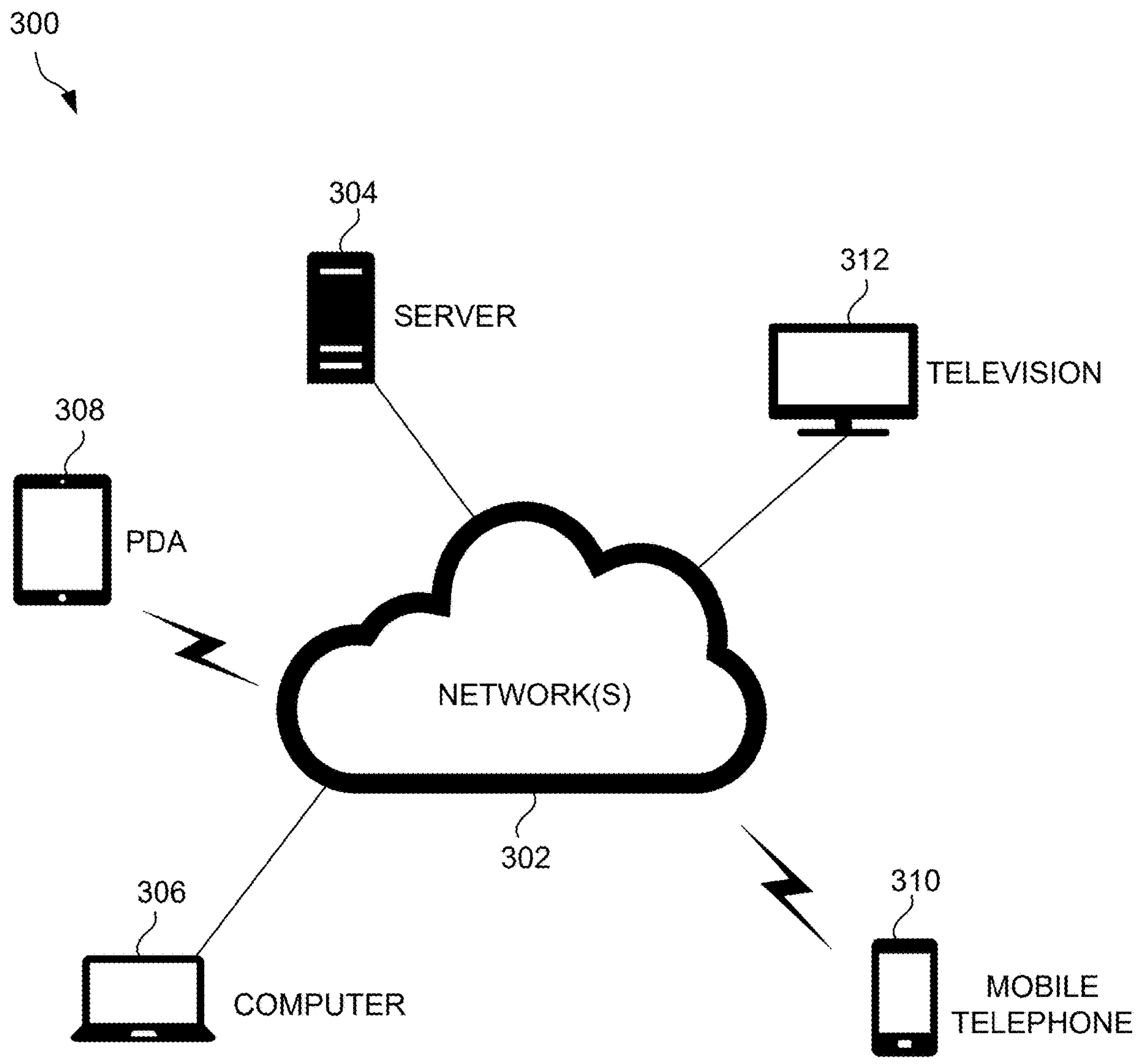
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
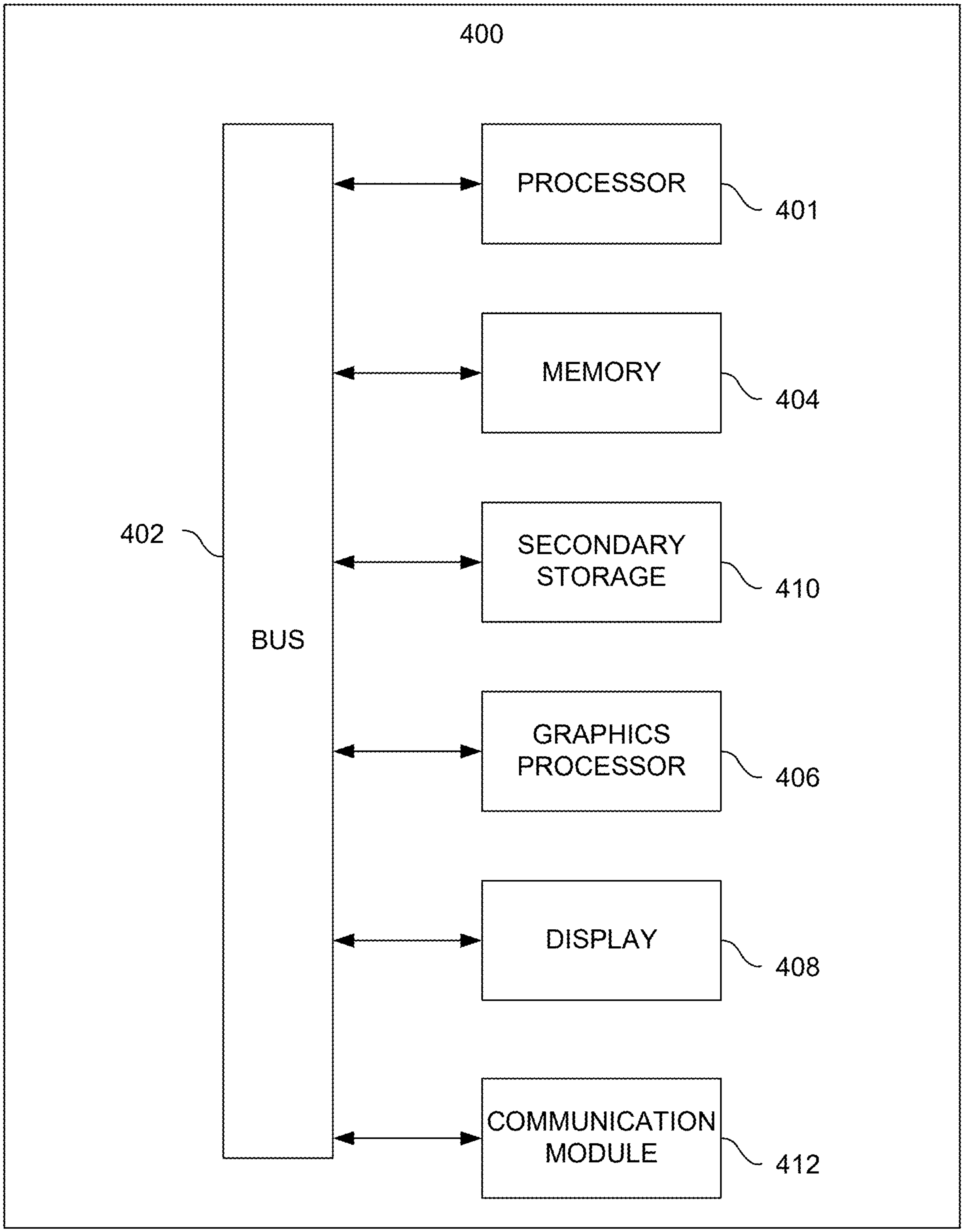
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to evolve a large language model (LLM)-based chatbot over at least one iteration that includes:

presenting, by a large language model (LLM)-based evaluator, a question to a LLM-based chatbot during a dialog with the LLM-based chatbot comprised of a sequence of question and answer pairs;

receiving, by the LLM-based evaluator, an answer to the question from the LLM-based chatbot;

evaluating, by the LLM-based evaluator, the answer according to one or more evaluation metrics and a ground truth;

determining, by the LLM-based evaluator, that a result of the evaluation is unsatisfactory; and presenting, by the LLM-based evaluator, a follow-up question to the LLM-based chatbot designed to encourage a new answer of the LLM-based chatbot to be satisfactory with respect to the ground truth and to cause an optimization of the LLM-based chatbot.

2. The non-transitory computer-readable media of claim 1, wherein the LLM-based chatbot is evolved over a plurality of iterations each corresponding to different question and answer pair in the sequence of question and answer pairs.

3. The non-transitory computer-readable media of claim 2, wherein when the LLM-based evaluator determines that a result of the evaluation for a given question and answer pair is satisfactory with respect to the ground truth, then the LLM-based evaluator begins a next iteration of the plurality of iterations.

4. The non-transitory computer-readable media of claim 1, wherein the evaluating of the answer is further performed according to prior question and answer pairs occurring in the dialog.

5. The non-transitory computer-readable media of claim 1, wherein the one or more evaluation metrics include one or more automatically calculable natural language processing (NLP) measures.

6. The non-transitory computer-readable media of claim 1, wherein evaluating, by the LLM-based evaluator, the answer according to the one or more evaluation metrics and the ground truth includes:

calculating a score for the answer based on the one or more evaluation metrics and the ground truth.

7. The non-transitory computer-readable media of claim 6, wherein the result of the evaluation is unsatisfactory when the score is below a predefined threshold.

8. The non-transitory computer-readable media of claim 1, wherein the LLM-based evaluator presents up to a threshold number of follow-up questions until the new answer of the LLM-based chatbot is evaluated to be satisfactory with respect to the ground truth.

9. The non-transitory computer-readable media of claim 8, wherein when the LLM-based evaluator presents the threshold number of follow-up questions without the new answer of the LLM-based chatbot being evaluated as satisfactory with respect to the ground truth, then an error analysis is caused to be performed on the LLM-based chatbot.

10. The non-transitory computer-readable media of claim 1, wherein the LLM-based chatbot is initially trained on a dataset comprised of individual question and answer pairs.

11. The non-transitory computer-readable media of claim 10, wherein the LLM-based chatbot evolved to include a multi-turn question and answer dataset.

12. The non-transitory computer-readable media of claim 1, wherein the device is further caused to:

output the evolved LLM-based chatbot for use.

13. The non-transitory computer-readable media of claim 1, wherein the follow-up question prompts the LLM-based chatbot to return the new answer that is more closely aligned with the ground truth than the answer.

14. The non-transitory computer-readable media of claim 13, wherein the method further comprises, at the computer system:

evaluating, by the LLM-based evaluator, the new answer according to the one or more evaluation metrics and the ground truth;

determining, by the LLM-based evaluator, that a new result of the evaluation of the new answer is satisfactory; and responsive to determining that the new answer is satisfactory, inputting to the LLM-based chatbot a summary of the evaluation of the new answer and an explanation comparing the new answer to the ground truth to cause the LLM-based chatbot to evolve by learning from the summary and the explanation.

15. A method, comprising:

at a computer system, evolving a large language model (LLM)-based chatbot over at least one iteration that includes:

presenting, by a large language model (LLM)-based evaluator, a question to a LLM-based chatbot during a dialog with the LLM-based chatbot comprised of a sequence of question and answer pairs;

receiving, by the LLM-based evaluator, an answer to the question from the LLM-based chatbot;

evaluating, by the LLM-based evaluator, the answer according to one or more evaluation metrics and a ground truth;

determining, by the LLM-based evaluator, that a result of the evaluation is unsatisfactory; and presenting, by the LLM-based evaluator, a follow-up question to the LLM-based chatbot designed to encourage a new answer of the LLM-based chatbot to be satisfactory with respect to the ground truth and to cause an optimization of the LLM-based chatbot.

16. The method of claim 15, wherein the LLM-based chatbot is evolved over a plurality of iterations each corresponding to different question and answer pair in the sequence of question and answer pairs.

17. The method of claim 16, wherein when the LLM-based evaluator determines that a result of the evaluation for a given question and answer pair is satisfactory with respect to the ground truth, then the LLM-based evaluator begins a next iteration of the plurality of iterations.

18. The method of claim 15, wherein evaluating, by the LLM-based evaluator, the answer according to the one or more evaluation metrics and the ground truth includes:

calculating a score for the answer based on the one or more evaluation metrics and the ground truth.

19. The method of claim 18, wherein the result of the evaluation is unsatisfactory when the score is below a predefined threshold.

20. A system, comprising:

a non-transitory memory storing instructions; and one or more processors in communication with the non-transitory memory that execute the instructions to evolve a large language model (LLM)-based chatbot over at least one iteration that includes:

presenting, by a large language model (LLM)-based evaluator, a question to a LLM-based chatbot during a dialog with the LLM-based chatbot comprised of a sequence of question and answer pairs;

receiving, by the LLM-based evaluator, an answer to the question from the LLM-based chatbot;

evaluating, by the LLM-based evaluator, the answer according to one or more evaluation metrics and a ground truth;

determining, by the LLM-based evaluator, that a result of the evaluation is unsatisfactory; and presenting, by the LLM-based evaluator, a follow-up question to the LLM-based chatbot designed to encourage a new answer of the LLM-based chatbot to be satisfactory with respect to the ground truth and to cause an optimization of the LLM-based chatbot.

* * * * *